United States Patent [19]
Williams

[11] Patent Number: 5,261,589
[45] Date of Patent: Nov. 16, 1993

[54] APPARATUS FOR COLD BUTT WELDING OF THIN WIRE

[76] Inventor: Raymond Williams, 9372 Elm St., Chadwicks, N.Y. 13319

[21] Appl. No.: 932,375

[22] Filed: Aug. 19, 1992

[51] Int. Cl.$^5$ .............................. B23K 20/02
[52] U.S. Cl. ........................ 228/3.1; 228/44.3; 228/115
[58] Field of Search .............. 228/3.1, 44.3, 115

[56] References Cited

U.S. PATENT DOCUMENTS 3,336,655  8/1967  Rozmus ................ 228/3.1
3,768,718 10/1973  Rozmus et al. ........ 228/3.1

FOREIGN PATENT DOCUMENTS

1-138077  5/1989  Japan ................ 228/3.1

Primary Examiner—Samuel M. Heinrich
Assistant Examiner—Jeffrey T. Knapp
Attorney, Agent, or Firm—Harold L. Burstyn

[57] ABSTRACT

Apparatus for cold butt welding of wire provides a die made in one or two pieces with square or angled ends. Its four members can move in both horizontal and vertical directions and still maintain their alignment. Spring forces, similar to those in tuning forks, help maintain alignment without adjustment. The die can be "tuned" for optimal performance with a particular kind or size of wire. Making the die from a single piece of metal greatly simplifies its manufacture.

1 Claim, 9 Drawing Sheets

APPARATUS FOR COLD BUTT WELDING OF THIN WIRE

BACKGROUND OF THE INVENTION

This invention relates to the working of fine wires, and, more particularly, to an apparatus for cold welding of small diameter wire.

Small diameter wire is widely used, especially in electronic circuitry. For example, an integrated circuit ("IC") may make use of wire between 0.025 mm and 0.25 mm in diameter. Though in wide use, such wires are hard to work. In particular, to join one coil to another in order to make a continuous conductor becomes extremely difficult.

Apparatus for cold welding (strictly speaking, forging) of such wire is known, e.g., U.S. Pat. No. 3,680,761. The process consists of placing an end of one fine wire against an end of another fine wire. By great force exerted precisely along the wires' length, the two wires are joined together into a single wire without any overlap.

In conventional cold wire welding apparatus, pairs of dies mounted in blocks selectively grip the wire ends and upset them to form the weld. Each die contains a groove. A pair of grooves act together, when the pair of dies is closed, to form a wire receiving cavity, within which the wire ends are brought together and joined.

The conventional apparatus uses four independent die blocks arranged in pairs. Each pair of blocks grips a wire end. The pairs are forced together in a machine.

The conventional apparatus is single-motion, relying on moving the dies to a common center to insure a tight weld. This apparatus distributes the forces between gripping and upsetting (that is, joining) the two wires.

Great force is necessary to effect a weld, so friction is high. Thus the blocks may move erratically and not come together at the same time. Hence, in the conventional apparatus, the wire ends may not be matched properly to effect a weld. Buckling of the fine wire is also a problem.

One way to overcome the problems of mismatch is to use springs, especially springs that are stronger in one direction than the other. The springs help to smooth the action as the dies move back and forth to weld the wire and then release it without damage.

The conventional apparatus uses a single cycle for welding fine wire. The cycle has three steps: (1) forward-grip wires, (2) upset-reverse-unupset wires, and (3) ungrip wires. Unfortunately, in this single cycle fine wire will break at the unupset position because of friction.

OBJECTS AND SUMMARY OF THE INVENTION

An object of the present invention is to provide apparatus for cold butt welding of fine wire that overcomes the drawbacks of the prior art.

A further object of the present invention is to provide apparatus for cold butt welding of fine wire that makes use of a one-piece die.

Still a further object of the present invention is to provide, in apparatus for cold butt welding of fine wire, a die that behaves like a tuning fork, in that spring forces in the die assist the welding process.

Still a further object of the present invention is to simplify the manufacture of dies for cold butt welding of fine wire by making a single-piece apparatus that functions like a pair of dies.

Briefly stated, the present invention provides apparatus for cold butt welding of wire comprising a die made in one or two pieces with square or angled ends. Its four members can move in both horizontal and vertical directions and still maintain their alignment. Spring forces, similar to those in tuning forks, help maintain alignment without adjustment. The die can be "tuned" for optimal performance with a particular kind or size of wire. Making the die from a single piece of metal greatly simplifies its manufacture.

According to an embodiment of the invention, apparatus for cold butt welding of a first and a second wire comprises: a die including first, second, third, and fourth members; the first member having a first groove in a first surface at a proximal end thereof; the second member having a second groove in a second surface at a proximal end thereof; the first and the second grooves being substantially collinear; the first and the second members forming a first tuning-fork-shaped body; the first and the second members being separated, at ends of the first and second grooves, by a first gap; the third member having a third groove in a third surface at a proximal end thereof; the fourth member having a fourth groove in a fourth surface at a proximal end thereof; the third and the fourth grooves being substantially collinear; the third and the fourth members forming a second tuning-fork-shaped body; the third and the fourth members being separated, at ends of the third and the fourth grooves, by a second gap; means for securing the first and the second tuning-fork-shaped bodies at distal ends thereof; the first and the second grooves being capable of substantially facing the third and the fourth grooves; means for clamping the first wire in the first and the third grooves; means for clamping the second wire in the second and the fourth grooves; and means for displacing the first and the third members clamping the first wire towards the second and the fourth members clamping the second wire, whereby a butt end of the first wire is forced into a compression weld with a butt end of the second wire.

According to a feature of the invention, apparatus for cold butt welding of a first and a second wire, comprises: a die including first, second, third, and fourth members; the first member having a first groove in a first surface at a proximal end thereof; the second member having a second groove in a second surface at a proximal end thereof; the first and the second grooves being substantially collinear; the first and the second members being integrally formed into a first tuning-fork-shaped body; the first and the second members being separated, at ends of the first and second grooves, by a first gap; the third member having a third groove in a third surface at a proximal end thereof; the fourth member having a fourth groove in a fourth surface at a proximal end thereof; the third and the fourth grooves being substantially collinear; the third and the fourth members being integrally formed into a second tuning-fork-shaped body; the third and the fourth members being separated, at ends of the third and the fourth grooves, by a second gap; means for securing the first and the second tuning-fork-shaped bodies at distal ends thereof; the first and the second grooves being capable of substantially facing the third and the fourth grooves; means for clamping the the first wire in the first and the third grooves; means for clamping the second wire in the second and the fourth grooves; and means for displacing the first and the third members clamping the first wire towards the second and the fourth members clamping the second wire, whereby a butt end of the first wire is forced into a compression weld with a butt end of the second wire.

According to another feature of the invention, apparatus for cold butt welding of a first and a second wire, comprises: a die including first, second, third, and fourth members; the first member having a first groove in a first surface at a proximal end thereof; the second member having a second groove in a second surface at a proximal end thereof; the first and the second grooves being substantially collinear; the first and the third members being integrally formed into a first tuning-fork-shaped body; the first and the second members being separated, at ends of the first and second grooves, by a first gap; the third member having a third groove in a third surface at a proximal end thereof; the fourth member having a fourth groove in a fourth surface at a proximal end thereof; the third and the fourth grooves being substantially collinear; the second and the fourth members being integrally formed into a second tuning-fork-shaped body; the third and the fourth members being separated, at ends of the third and the fourth grooves, by a second gap; means for securing the first and the second tuning-fork-shaped bodies at distal ends thereof; the first and the second grooves being capable of substantially facing the third and the fourth grooves; means for clamping the first wire in the first and the third grooves; means for clamping the second wire in the second and the fourth grooves; and means for displacing the first and the third members clamping the first wire towards the second and the fourth members clamping the second wire, whereby a butt end of the first wire is forced into a compression weld with a butt end of the second wire.

The above, and other objects, features and advantages of the present invention will become apparent from the following description read in conjunction with the accompanying drawings, in which like reference numerals designate the same elements.

BRIEF DESCRIPTION OF THE DRAWINGS

FIGS. 13(A–D) show a tool employing an angled-end die in an interrupted cycle. In FIG. 13(A) the die is open to receive the wires to be welded. In FIG. 13(B) a moving anvil closes (that is, grips the wires) and then upsets in one forward motion. FIG. 13(C) shows the tool in the grip-upset position with the die closed and a pair of locking wedges locked. FIG. 13(D) shows the tool in the ungrip position after the wires are welded, with the locking wedges still locked but the die open.

FIGS. 14(A–D) shows a tool employing a square-end die in an interrupted cycle. In FIG. 14(A) the die is open to receive the wires to be welded. FIG. 14(B) shows the tool in the grip position with the die closed. FIG. 14(C) shows the tool in the upset position with the locking wedges locked. FIG. 14(D) shows the tool in the ungrip position after the wires are welded, with the locking wedges still locked but the die open.

FIGS. 21(A–D) show an end view of an apparatus for stringing and cutting wires that employs the two-piece die shown in FIGS. 9–11. In FIG. 21(A) the die is inserted into a machine eccentric, and a pin is retracted. In FIG. 21(B) the machine-eccentric is inserted and turned to move one side upward while the pin is partially inserted to prevent upper and lower right members from moving. The pair of wires to be welded are strung at different levels, and the machine handle is actuated to close the die. In FIG. 21(C) the machine-eccentric is turned back, thereby cutting wire ends. FIG. 21(D) shows the pin inserted further to lock both halves of the die so that welding may take place.

DETAILED DESCRIPTION OF THE PREFERRED EMBODIMENT

Figure 1:
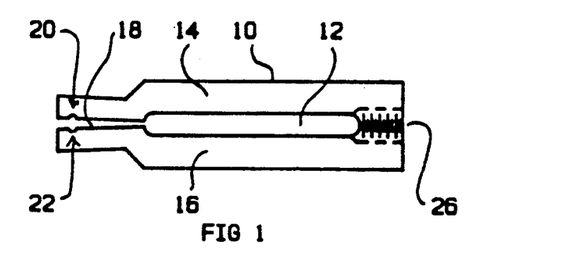
FIG. 1 is a side view of the angled die of the present invention.

Referring to FIG. 1, a die 10 is constructed from a single piece of metal, preferably tool steel (for example, CPM M-4), tempered to approximately 62 Rockwell hardness. A horizontal portion of a slot 12, running from an end proximal to an upper wire groove 20 and a lower wire groove 22 almost to an end distal thereto, divides die 10 into an upper member 14 and a lower member 16. At the proximal end, slot 22 narrows to form a throat 18. At the distal end, slot 12 is closed. Edges of upper member 14 and lower member 16 furthest from the closed end of slot 12 may be beveled on facing sides of throat 18 for ease of inserting wire. The ends of upper member 14 and lower member 16 respectively contain upper wire groove 20 and lower wire groove 22.

At the distal end of die 10 a threaded hole 26 is bored to join slot 12. Threaded hole 26 is the means by which die 10 is affixed to a tool in the present invention.

Figure 2:
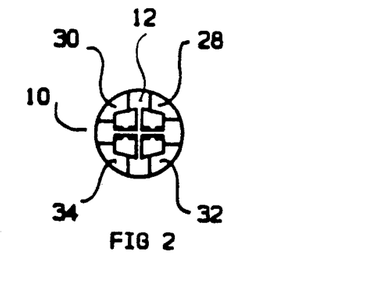
FIG. 2 is an end view of the angled die of the present invention.
Figures 3, 4:
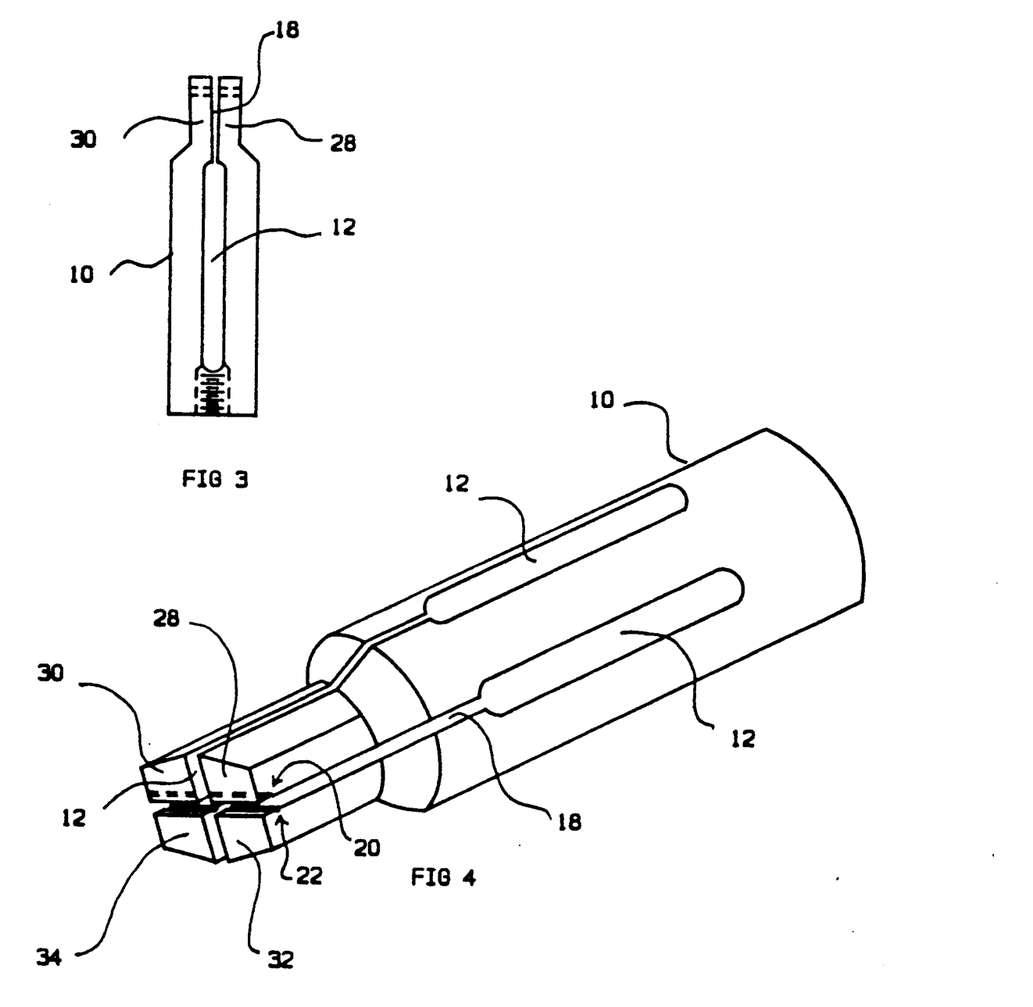
FIG. 3 is a top view of the angled die of the present invention.
FIG. 4 is a perspective view of the angled die of the present invention.

Referring to FIGS. 2–4, a vertical portion of slot 12 also splits die 10 into an upper right member 28, an upper left member 30, a lower right member 32, and a lower left member 34.

Referring to FIGS. 2 and 4, the proximal ends of upper right member 28, upper left member 30, lower right member 32, and lower left member 34 may be cut at an angle of approximately 20 degrees on the side opposite the bevel, as shown in FIGS. 2 and 4, or they may be square.

Referring to FIG. 4, in operation, a pair of wires (not shown, see 46a and 46b in FIGS. 13, 14, 15, 17, and 19) to be welded are fed from opposite directions into a wire-receiving cavity or channel between upper wire groove 20 and lower wire groove 22. As explained further below, upper right member 28 and lower right member 32 clamp wire 46b fed in from the right. Similarly, upper left member 30 and lower left member 34 clamp wire 46a fed in from the left.

Figure 5:
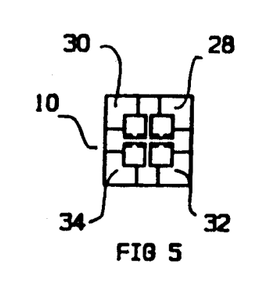
FIG. 5 is a top view of the square die of the present invention.
Figure 6:
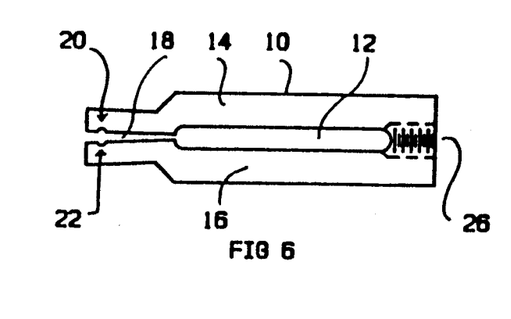
FIG. 6 is a side view of the square die of the present invention.
Figure 7:
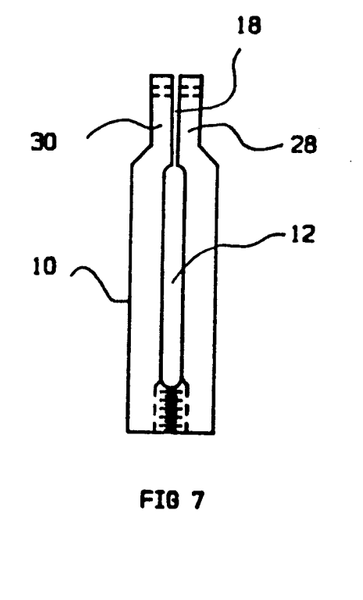
FIG. 7 is a front view of the square die of the present invention.

Referring to FIGS. 5–7, in another embodiment, die 10 is constructed with proximal ends of upper right member 28, upper left member 30, lower right member 32, and lower left member 34 cut square on all sides. In this embodiment, die 10 may be made in two pieces, upper and lower or left and right. If made in upper and lower pieces, the upper piece contains upper right member 28 and upper left member 30; the lower piece, lower right member 32 and lower left member 34. If made in left and right pieces, the left piece contains upper left member 30 and lower left member 34; the right piece, upper right member 28 and lower right member 32.

Referring to FIGS. 8–12, in a preferred embodiment, die 10 is made in two pieces split vertically, that is, into a left piece 29 and a right piece 31. Left piece 29 contains upper left member 30 and lower left member 34, each with a square proximal end. Right piece 31 contains upper right member 28 and lower right member 32, each with a square proximal end.

Figure 8:
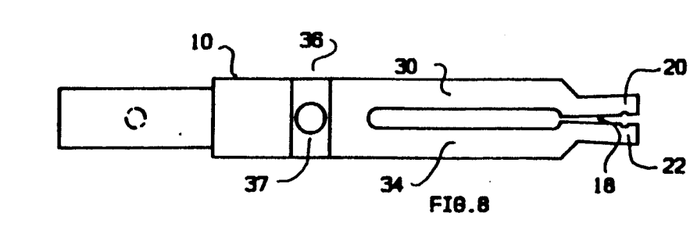
FIG. 8 is a view of one side of the square die of the present invention made in two pieces split vertically.
Figure 8A:
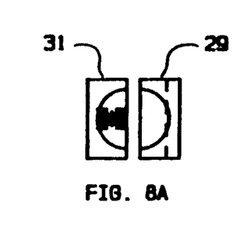
FIG. 8(A) is a view from the end of the square die of FIG. 8 distal to the wire groove.

Referring to FIG. 8, left piece 29 has at its distal end an eccentric crank slot 36 and a hole 37 for a locating pin.

Figure 9:
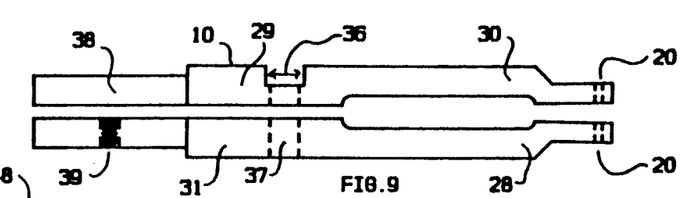
FIG. 9 is a top view of the square die of the present invention made in two pieces split vertically. The pieces are shown separated for clarity.
Figure 9A:
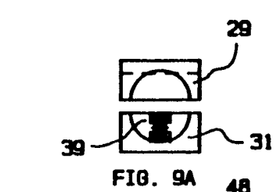
FIG. 9(A) is a view from the end of the square die of FIG. 9 distal to the wire groove.

Referring to FIG. 9, the distal ends of left piece 29 and right piece 31 each terminate in a rounded guide 38. The distal end of rounded guide 38 of right piece 31 is pierced by a threaded hole 39.

Figures 10, 10A:
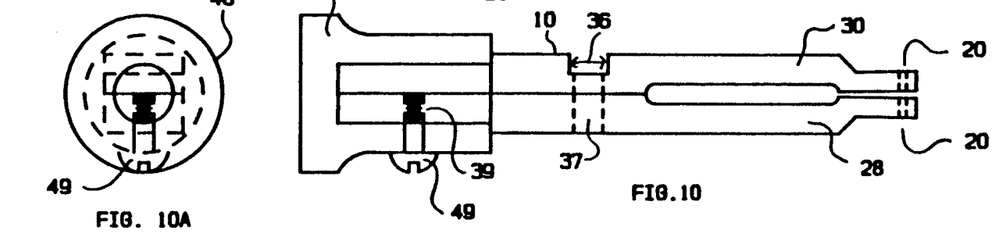
FIG. 10 is a top view of the square die of the present invention made in two pieces split vertically, with the pieces clamped together in a sleeve.
FIG. 10(A) is a view from the end of the clamped square die of FIG. 10 distal to the wire groove.
Figure 11:
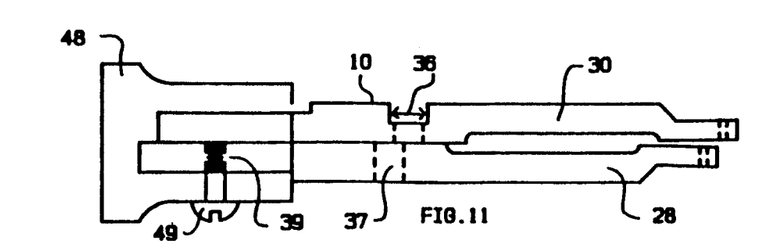
FIG. 11 is a top view of the square die of the present invention made in two pieces split vertically, with the pieces separated within the sleeve.
Figure 12:
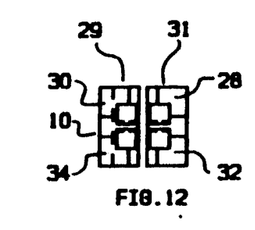
FIG. 12 is a view of end of the square die of FIG. 8 proximal to the wire groove.
Figure 21:
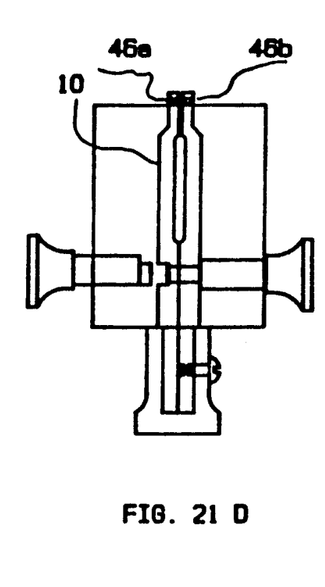

Referring to FIGS. 9–11, the distal ends of left piece 29 and right piece 31 fit together snugly in a sleeve 48 held by a screw 49 that fastens right piece 31 into threaded hole 39. Since it is not held in place, left piece 29 can slide back and forth while maintaining contact with right piece 31. An eccentric crank pin 60 (not shown; see FIGS. 15–21) in eccentric crank slot 36 slides left piece 29 back and forth. A sliding locating pin 62 (not shown; see FIG. 21) in hole 37 locates die 10 in a tool 50 (not shown; see FIGS. 15, 17, and 19) and maintains the alignment of left piece 29 and right piece 31 during welding. Turning eccentric crank pin 60 positions left piece 29 for loading by the stringing method (see FIG. 21).

Figure 13:
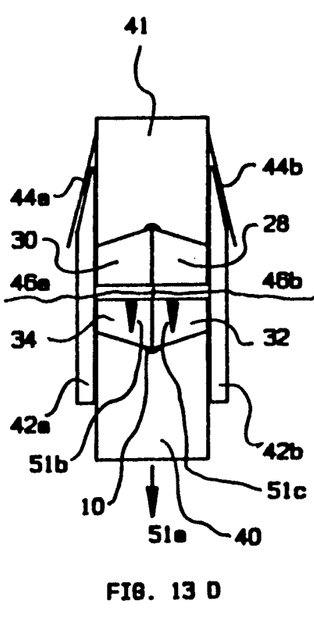

Referring to FIG. 13, a tool 50 (not shown; see FIGS. 15, 17, and 19) includes a moving anvil 40 and a stationary anvil 41 between which die 10 is positioned. In this embodiment, die 10 is the one-piece die of FIGS. 1–4. Left locking wedge 42a and right locking wedge 42b, which taper approximately five degrees, are positioned on either side of moving anvil 40. Locking wedges 42a, 42b move slidably away from moving anvil 40 to an unlocked position and towards stationary anvil 41 to a locked position. In locked position, locking wedges 42a, 42b are held against angular stops 44a, 44b.

The nonreversing cycle of welding wires 46a, 46b into a single wire 46 has several steps. Referring to FIG. 13(A), die 10 is opened to receive wires 46a and 46b. Referring to FIG. 13(B), die 10 is closed by putting an upward force (shown by arrow 43) on moving anvil 40. Wires 46a and 46b are gripped and upset between upper right and left members 28, 30 and lower right and left members 32, 34. Right-angled pairs of arrows 45a, 45b, 45c, and 45d show the forces applied to wires 46a and 46b.

Referring to FIG. 13(C), locking wedges 42a and 42b are then forced upward into locked position against 44a, 44b. The directions of the forces acting are shown by arrows 47a and 47b. Die 10 remains in the upset position.

Referring to FIG. 13(D), with locking wedges 42a, 42b still locked, die 10 is opened by retracting moving anvil 40. Right and left upper members 28, 30 remain together while separating from right and left lower members 32, 34. Arrows 51a, 51b, and 51c show the direction of the forces. When locking wedges 42a, 42b are retracted to the unlocked position, single wire 46 is ungripped and can be withdrawn without damage. Another pair of wires 46a, 46b to be welded can then be inserted.

By making die 10 from a single piece of metal, its four members can move in both horizontal and vertical directions and still maintain their alignment. Spring forces similar to those in tuning forks help maintain alignment without special adjustment. These forces can be readily varied by widening slot 12 or by changing the lengths of upper and lower members 28, 30, 32, 34. That is, it is possible to "tune" die 10 for optimal performance with a particular kind or size of fine wire.

Making die 10 from a single piece of metal also greatly simplifies its manufacture. The mating surfaces at the proximal ends of right and left upper members 28, 30 and right and left lower members 32, 34 are always aligned with the wire groove. By pinching the fork-like structure on a thin disc-lap, the kissing faces of right upper member 28, left upper member 30, right lower member 32, and left lower member 34 can be made nearly parallel when closed. The rotation of upper and lower right and left members 28, 30, 32, and 34 under the stress of the forces represented by arrow pairs 45a, 45b, 45c, and 45d can thereby be held to less than one percent, that is, almost eliminated.

Upper and lower wire grooves 20, 22 are formed by pinching a hardened wire while die 10 is soft. The faces of die 10 can be cleaned by simply wedging apart each opposing pair of right and left, upper and lower members 28, 30, 32, 34.

Figure 14:
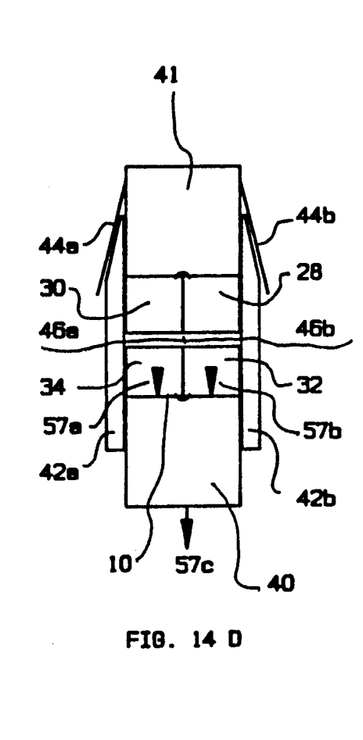

Referring to FIG. 14, in another embodiment of the present invention, die 10 has square ends. It is preferably the two-piece die of FIGS. 5–12. In this embodiment, the sequence of steps to weld a pair of wires 46a, 46b to form a single wire 46 is slightly different. Referring to FIG. 14(A), with no forces applied, upper and lower, right and left members 28, 30, 32, 34 of die 10 are open to receive wires 46a, 46b. Locking wedges 42a, 42b are retracted. Referring to FIG. 14(B), upward forces on moving anvil 40, represented by arrows 53a, 53b, and 53c, make die 10 grip wires 46a, 46b. Referring to FIG. 14(C), moving locking wedges 42a, 42b into the locked position extends wires 46a, 46b approximately one diameter and upsets them into a single wire 46. The forces acting are shown by arrows 55a, 55b, 55c, and 55d.

Referring to FIG. 14(D), when the forces on moving anvil 40 represented by arrows 53a, 53b, and 53c are released, moving anvil 40 retracts, as shown by arrows 57a, 57b, 57c, thereby ungripping single wire 46. Then locking wedges 42a, 42b are retracted. At this point, the welded single wire 46 can be removed.

When die 10 is square rather than angular, locking wedges 42a, 42b can execute upset without any force being applied to moving anvil 40.

The operations described above with reference to FIG. 14 are further explained with reference to FIGS. 15-20, which show tool 50 with die 10 installed therein.

Figure 15:
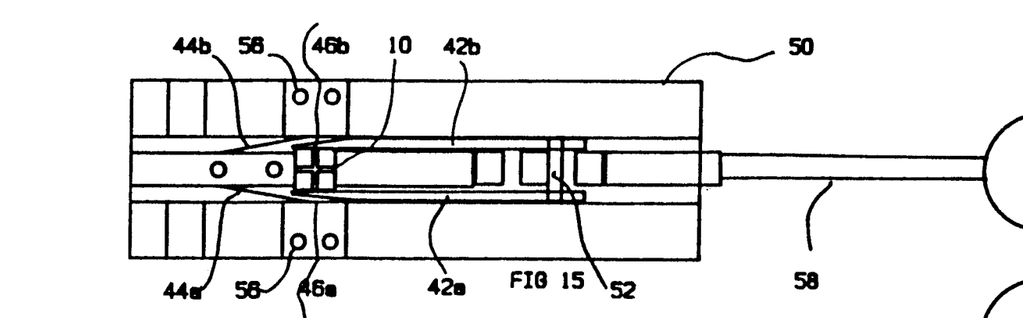
FIG. 15 is a top view of the tool with the die mounted at the load position shown in FIG. 14(A).
Figure 16:
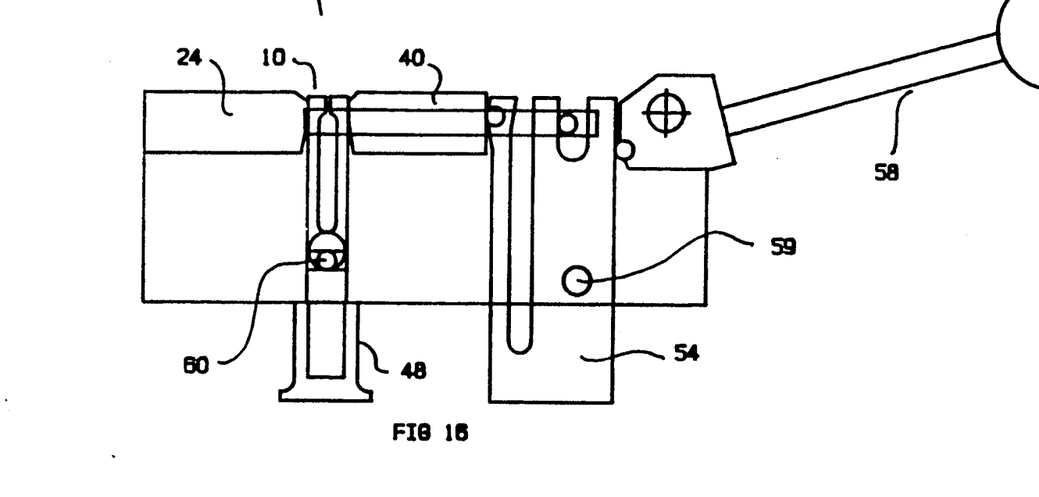
FIG. 16 is a side view of the tool with the die mounted at the load position shown in FIG. 14(A).

FIGS. 15 and 16 show respectively top and side views of tool 50 in the loading position of FIG. 14(A). A handle 58 is disengaged from a spring lever 54, which pivots about a lever pivot 59. Spring lever 54 can engage moving anvil 40. Spring lever 54 can also force a wedge drive pin 52 forward to move locking wedges 42a, 42b into a locked position. A pair of wire tension posts 56 hold wires 46a, 46b in place. A crank eccentric 60 can separate left piece 29 from right piece 31 to load wires 46a, 46b into die 10 for welding.

Figure 17:
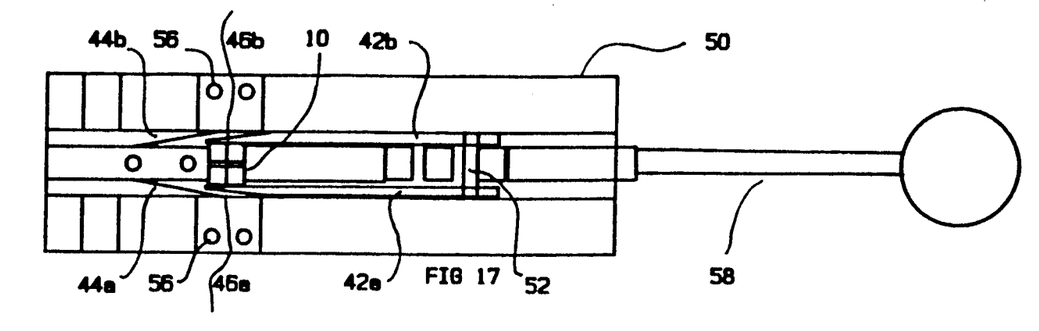
FIG. 17 is a top view of the tool with the die mounted at the grip position shown in FIG. 14(B).
Figure 18:
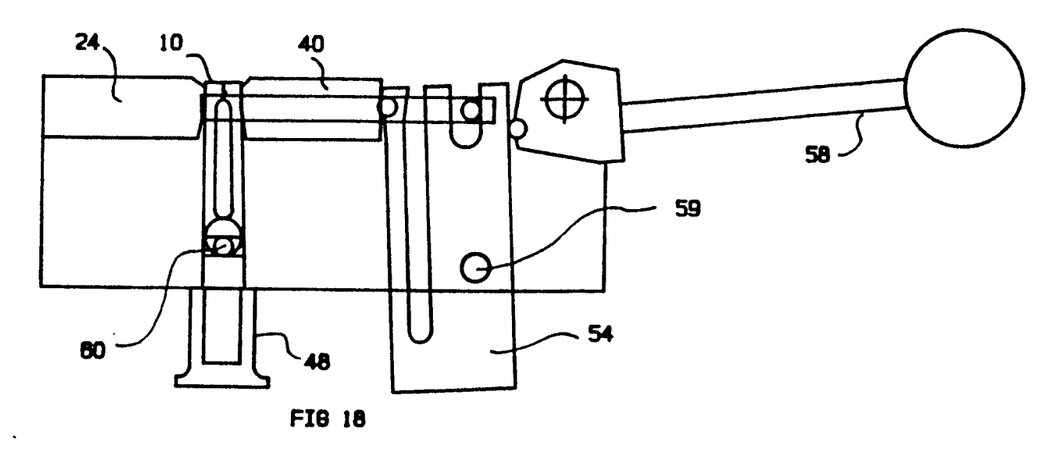
FIG. 18 is a side view of the tool with the die mounted at the grip position shown in FIG. 14(B).

FIGS. 17 and FIG. 18 show respectively top and side views of tool 50 in the grip position of FIG. 14(B). When handle 58 is depressed, it moves spring lever 54 about lever pivot 59, thereby forcing moving anvil 40 to close die 10 on wires 46a, 46b.

Figure 19:
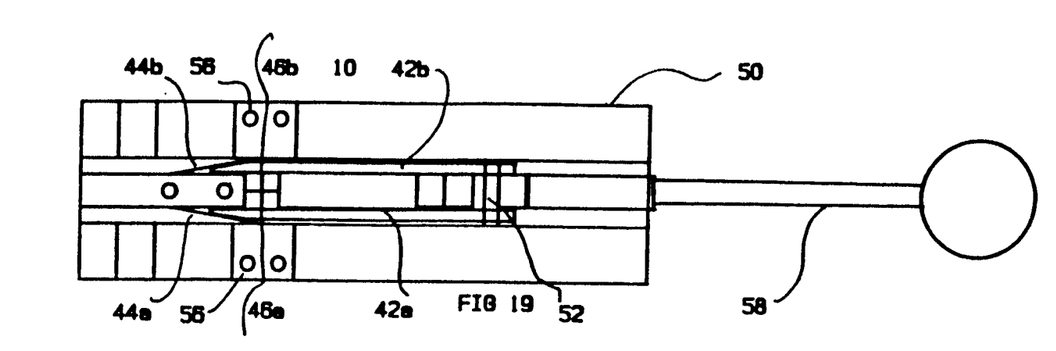
FIG. 19 is a top view of the tool with the die mounted at the upset position shown in FIG. 14(C).
Figure 20:
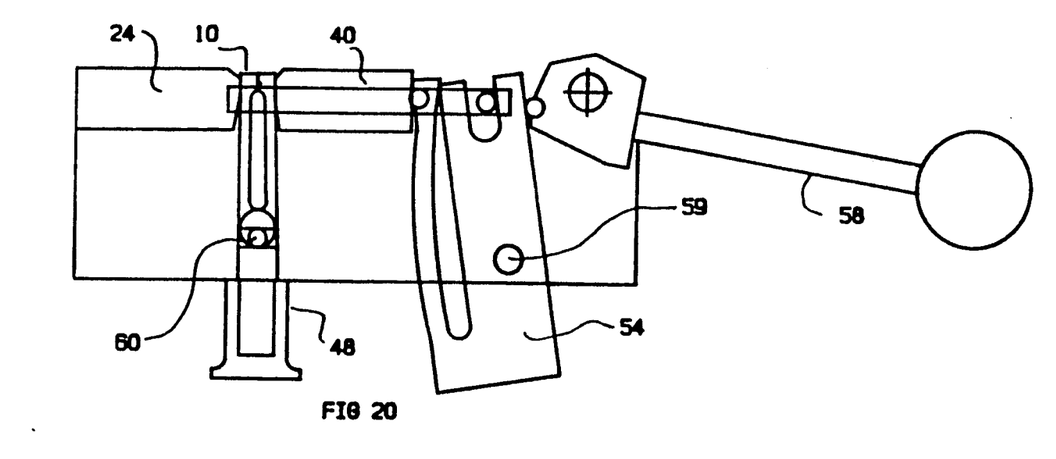
FIG. 20 is a side view of the tool with the die mounted at the upset position shown in FIG. 14(C).

FIGS. 19 and 20 show respectively top and side views of tool 50 in the upset position of FIG. 14(C). Further moving handle 58 forces spring lever 54 to force wedge drive pin 52 to move locking wedges 42a and 42b into locked position.

Releasing handle 58 opens die 10. As explained above with reference to FIG. 14(D), moving anvil 40 is retracted before locking wedges 42a, 42b are unlocked. A gap between spring lever 54 and wedge drive pin 52 permits this interrupted move above to be accomplished.

If die 10 is made in two pieces, the distal ends of left and right pieces 29, 31 fit snugly when held in tool 50. The proximal ends are slightly sprung to permit cantilevering when die 10 is in use.

As disclosed in U.S. Pat. No. 3,680,761, small wires are most easily loaded into the die by stringing at different levels, closing the die, and cutting with the vertical movement of one side. The two-piece die shown in FIG. 11 is typical. Upper and lower wire grooves 20, 22 are shifted by an eccentric pin 60, as shown in FIG. 21(B). Wire is strung taut between the die pieces and friction-gripped by four wire tension posts 56. As strung at upper and lower level, wires are gripped when the die is closed. By turning crank eccentric 60, the wire is cut by shearing at the die top and slot 12. After locating pin 62 is inserted through hole 39, welding can proceed as shown in FIG. 21(D).

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for cold butt welding of a first and a second wire, comprising:
   a die including first, second, third, and fourth members;
   said first member having a first groove in a first surface at a proximal end thereof;
   said second member having a second groove in a second surface at a proximal end thereof;
   said first and said second grooves being substantially collinear;
   said first and said second members being separated, at ends of said first and second grooves, by a first gap;
   said third member having a third groove in a third surface at a proximal end thereof;
   said fourth member having a fourth groove in a fourth surface at a proximal end thereof;
   said third and said fourth grooves being substantially collinear;
   said first, said second, said third, and said fourth members integrally forming a single elongated body;
   said third and said fourth members being separated, at ends of said third and said fourth grooves, by a second gap;
   means for securing said single body at distal ends of said first, said second, said third, and said fourth members;
   said first and said second grooves being capable of substantially facing said third and said fourth grooves;
   means for clamping said first wire in said first and said third grooves;
   means for clamping said second wire in said second and said fourth grooves; and
   means for displacing said first and said third members clamping said first wire towards said second and said fourth members clamping said second wire, thereby reducing said first and said second gaps, whereby a butt end of said first wire is forced into a compression weld with a butt end of said second wire.

* * * * *